US008109734B2

(12) United States Patent
Backhouse

(10) Patent No.: US 8,109,734 B2
(45) Date of Patent: Feb. 7, 2012

(54) ARTICLE FORMED FROM A COMPOSITE MATERIAL

(75) Inventor: Robert C Backhouse, Northchapel (GB)

(73) Assignee: Rolls-Royce PLC, London (GB)

( * ) Notice: Subject to any disclaimer, the term of this patent is extended or adjusted under 35 U.S.C. 154(b) by 422 days.

(21) Appl. No.: 12/379,530

(22) Filed: Feb. 24, 2009

(65) Prior Publication Data

US 2009/0246446 A1 Oct. 1, 2009

(30) Foreign Application Priority Data

Mar. 28, 2008 (GB) .................................. 0805604.6

(51) Int. Cl.

| | |
|---|---|
| ***F01D 5/14*** | (2006.01) |
| *F01D 5/28* | (2006.01) |
| *B64C 11/20* | (2006.01) |
| *B32B 27/04* | (2006.01) |
| *B32B 27/12* | (2006.01) |
| *D03D 13/00* | (2006.01) |
| *B29C 39/10* | (2006.01) |

(52) U.S. Cl. ................ 416/229 R; 416/223 R; 416/230; 244/35 R; 244/123.1; 244/124; 244/133; 428/76; 428/222; 428/298.1; 428/299.1; 428/375; 428/377; 428/378; 264/257; 264/258; 264/640; 442/59; 442/178; 442/205

(58) Field of Classification Search .............. 416/223 R, 416/229 R, 230; 428/76, 222, 298.1, 299.1, 428/367, 377; 264/257, 258, 640; 66/195, 66/203; 442/304, 305, 311, 312, 313, 314

See application file for complete search history.

(56) References Cited

U.S. PATENT DOCUMENTS

| | | | | |
|---|---|---|---|---|
| 4,051,289 | A * | 9/1977 | Adamson | 428/113 |
| 5,057,257 | A | 10/1991 | Neitzke | |
| 5,171,509 | A | 12/1992 | Le Masson et al. | |
| 5,809,805 | A * | 9/1998 | Palmer et al. | 66/84 A |
| 5,876,659 | A | 3/1999 | Yasutomi et al. | |
| 5,993,713 | A | 11/1999 | De la Puerta et al. | |
| 2004/0145079 | A1 | 7/2004 | Lin et al. | |

FOREIGN PATENT DOCUMENTS

| | | |
|---|---|---|
| EP | 0 594 131 A1 | 4/1994 |
| EP | 1 681 439 A1 | 7/2006 |
| GB | 1 291 718 | 10/1972 |
| JP | A-05-176656 | 7/1993 |
| JP | A-05-318472 | 12/1993 |
| JP | A-2003-291233 | 10/2006 |

OTHER PUBLICATIONS

Search Report issued in corresponding European Patent Application No. 09250356 dated Mar. 15, 2011.

* cited by examiner

*Primary Examiner* — David Sample
*Assistant Examiner* — Kendra Keith
(74) *Attorney, Agent, or Firm* — Oliff & Berridge, PLC

(57) ABSTRACT

An article such as a fan blade of a turbofan engine comprises a core made up of components at least some of which comprise packs of rods embedded in a resin matrix material. The rods extend in the span-wise direction of the blade to resist centrifugal forces imposed on the blade during operation. The core is encased in a skin formed from preforms which may comprise fabric reinforcements.

26 Claims, 2 Drawing Sheets

ARTICLE FORMED FROM A COMPOSITE MATERIAL

BACKGROUND

This invention relates to an article formed from a composite material, and is particularly, although not exclusively, concerned with such an article in the form of an aerofoil component such as a fan blade of a turbofan engine, turbo prop, ducted fans and other such turbomachinery.

DESCRIPTION OF RELATED ART

Fan blades, particularly those of turbofan engines, turbo props, ducted fans and other such turbomachinery are subjected to significant forces in operation. Such blades must be capable of withstanding not only centrifugal forces and forces generated by the movement of air, but also forces arising from impact by foreign objects, such as birds. Furthermore, if minor damage occurs as a result of foreign object impact, it is important that the damage does not propagate through the blade during continued operation as to diminish its structural and functional integrity.

Composite fan blades are currently manufactured using highly toughened thermosetting epoxy resin pre-impregnated materials which are laid up in a predetermined stacking sequence to ensure careful distribution of ply terminations in order to achieve the required damage tolerance. It is important that ply terminations (ie cut fibre ends) are not concentrated in a single area or plane, since they represent locations of potential weakness in the blade.

Such manufacturing processes are expensive because the materials are costly, deposition rates are slow and there are stringent quality assurance requirements.

SUMMARY

According to the present invention there is provided an article formed from a composite material, the article comprising abutting core components, wherein at least one of the core components comprises a pack of reinforcement rods disposed parallel to each other and embedded in a resin matrix, each rod comprising a resin-bonded bundle of reinforcement fibres.

The rods may have a circular cross-section, although other shapes such as square may be used. The rods may have a transverse dimension (diameter or equivalent) which is not less than 1.5 mm and not more than 3.5 mm. The reinforcement fibres may be carbon fibres which run parallel to the rod length.

The resin matrix may be a cured syntactic material, a tough adhesive composition or a composite bulk-moulding compound.

The pack may be one of a plurality of packs forming the article. The or each pack may comprise not less than 100 reinforcement rods. The packs may be overwrapped by braiding or reinforcement fabric. Each individual reinforcement rod may have an overwinding of reinforcing fibres in a resin matrix.

Each rod may comprise a main body provided with spacing projections so that, in the pack, the main bodies of the respective rods are spaced apart from each other by contact between the projections of adjacent rods or by a projection on one rod and the main body of an adjacent rod. The projections may have a spiral form about the longitudinal axis of the rod and may be a separate winding, for example of wire, or an integral formation on the main body.

In one embodiment in accordance with the present invention, the rods extend substantially parallel to a lengthwise direction of the article.

The article may have an outer skin which encloses the or each pack of reinforcement rods. The outer skin may comprise reinforcement fibres in a resin matrix. The reinforcement fibres of the outer skin may be disposed in fabric layers, for example in a multiaxial warp knit fabric (non-crimp fabric), with each fabric layer comprising fibres extending in different orientations. For example, some of the fibres may extend at 90° to the lengthwise directions of the respective rods, and other fibres may extend at angles between 30° and 60° to the lengthwise direction of the rods. In one embodiment, the multiaxial warp knit fabric has fibres extending at +45°/90°/−45° with respect to the rods.

The area weight in the fabric of the 90° fibres may vary in the lengthwise direction of the rods.

The outer skin may comprise separate preforms made up of stacked layers of the fabric, which layers are bonded to one another to form the preform.

The article may be a component of a gas turbine engine, and in particular may be an aerofoil component such as a fan blade of a turbofan engine.

Another aspect of the present invention provides a method of manufacturing an article of composite material, the method comprising:

assembling a plurality of reinforcement rods into a pack in which the rods are parallel to each other, each rod comprising a resin-bonded bundle of reinforcement fibres;

impregnating the pack with a first settable or curable composition, and causing or allowing the composition to set or cure to form a resin matrix in which the rods are embedded;

providing a fibre wrapping around the pack to form a core component;

assembling a core of the article, the core including abutting core components;

assembling a fibre reinforcement over the core;

placing the core with the assembled fibre reinforcement in a mould corresponding to the desired shape of the article; and admitting a second settable or curable composition into the mould and causing or allowing the second composition to set or cure.

In an embodiment of a method as defined above, the fibre reinforcement comprises a plurality of preforms, each preform being made up of reinforcing fabric layers.

For a better understanding of the present invention, and to show more clearly how it may be carried into effect reference will now be made, by way of example, to the accompanying drawings, in which:

DETAILED DESCRIPTION

Figure 1:
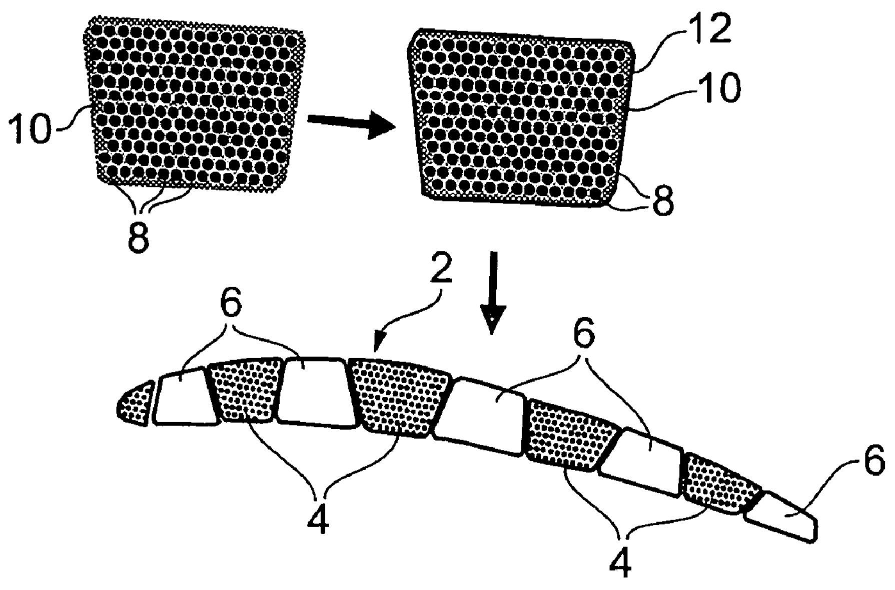
FIG. 1 diagrammatically represents the formation of rod packs and assembly of the rod packs to form a core of a fan blade.

As shown in FIG. 1, a core 2 of a fan blade for a turbofan engine is assembled from core components 4, 6. Each core component extends spanwise of the fan blade, and is preferably parallel to the line of action of centrifugal force acting on the blade when mounted on a rotating rotor.

As shown in FIG. 1, the core components 4, 6 are of two kinds. The first kind of core components are alternatively referred to as rod packs 4 made up of a plurality of reinforcing rods 8 embedded in a resin matrix 10. These rod packs 4 are manufactured from small diameter composite rods, having a circular cross-section with a diameter in the range 1.5-3.5 mm, and there may be 100 or more of the rods 8 in each of the rod packs 4. The rods may comprise high strength or intermediate modulus carbon fibres. The rods are cut to length (substantially the length of the finished fan blade) and embedded in a resin matrix. The matrix may comprise a curable syntactic paste or tough adhesive in which the rods may be embedded by vacuum casting. Alternatively, the rods may be embedded in a composite moulding compound in a compression moulding or injection moulding process. It will be appreciated from FIG. 1 that the cross-sectional shape of the pack has a generally quadrilateral form, of which two opposite faces are shaped to conform to the pressure and suction surfaces of the fan blade. The other two faces are oriented to provide webs between the pressure and suction surfaces of the fan blade, as will be described below.

After forming of the rod assemblies in the resin matrix, the assemblies are individually overbraided with a biaxial or triaxial overbraiding material, or are wrapped in reinforcement fabric or overwrapping 12.

The overbraided or overwrapped rod packs 4 are then assembled together, and with the other components 6, to form the core 2. The other components 6 may be unreinforced mouldings formed from the resin used for the matrix of the rod packs 4, for example a cured syntactic paste. Alternatively, they may be made from different materials, or they may be replaced by further rod packs 4. Thus in one embodiment, all of the components of the core 2 may be rod packs 4.

Figure 2:
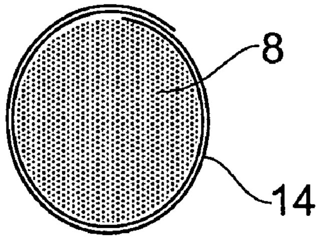
FIG. 2 is a sectional view of a rod of the rod packs.

The rods 8 themselves, as shown in FIG. 2, may be individually overwrapped by a suitable reinforcing material. For example they may be overwound under tension with pre-impregnated reinforcing fibres 14 which are subsequently cured. The purpose of overwinding is to suppress separation of the individual fibres of the rod under transverse tension occurring as a result of impact, axial loading or crack growth. The rods 8 themselves may be made from carbon fibres in a pultrusion process, and the overwinding may be carried out after pultrusion in a semi-continuous or batch process.

Furthermore, the rods 8 may be additionally overwound or moulded with a wire or thread (not shown) in a spiral fashion to provide spacing projections which engage the corresponding projections, or main bodies, of adjacent rods in order to maintain a spacing between the main bodies of the rods to allow penetration of the resin matrix material during manufacture of the rod packs 4.

Figure 4:
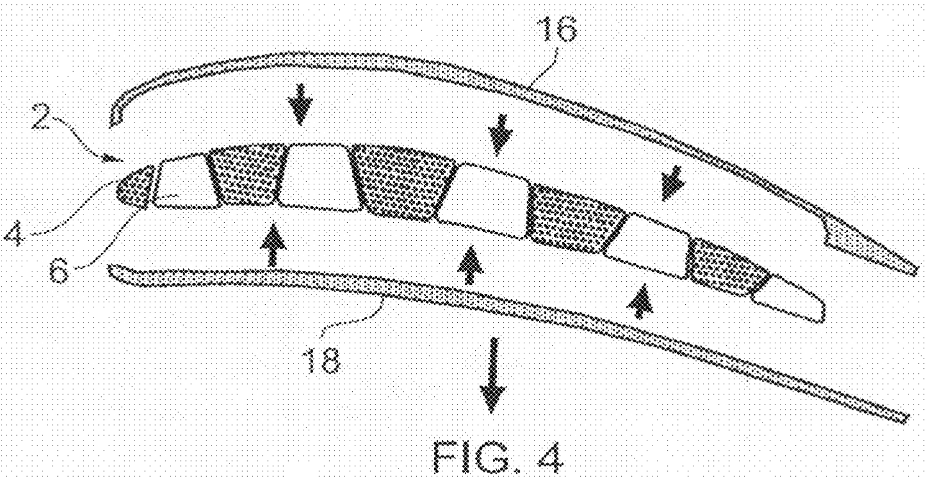
FIG. 4 shows outer skin preforms formed from the fabric of FIG. 3, in conjunction with the core represented in FIG. 1.

In one embodiment the core 2 shown in FIG. 1 is provided with an outer skin to form the finished article. The outer skin may be formed by direct wrapping of the core by a suitable reinforcing material, but in one embodiment the skin is made up of two preforms 16,18 as shown in FIG. 4. The preforms 16,18 are made by laying up layers of a reinforcing fabric which are then pre-compressed to create the handleable preforms 16, 18 shown in FIG. 4. In order to maintain the integrity of the preforms 16, 18, a suitable heat or pressure activated thermoplastic web or powder binder may be disposed between each pair of adjacent layers to bond the layers together when subjected to pressure or heat.

Figure 3:
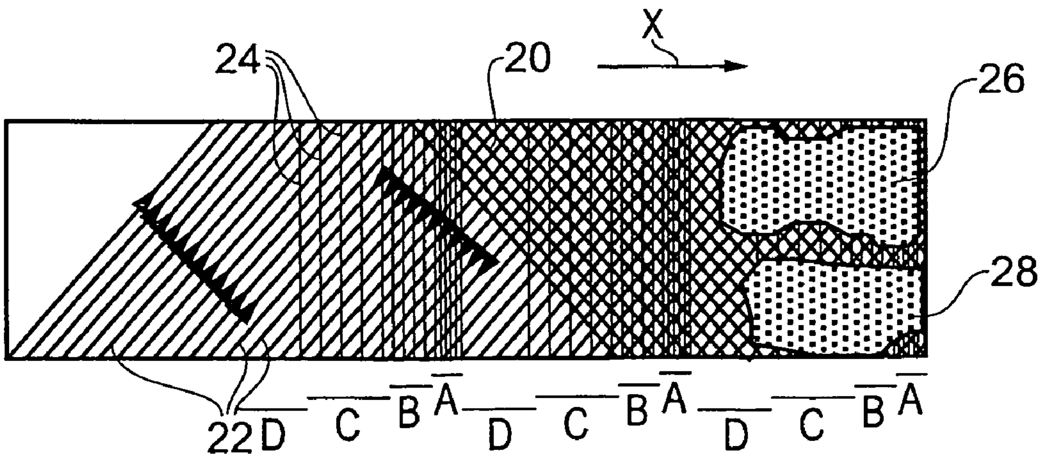
FIG. 3 diagrammatically represents a reinforcement fabric for forming an outer skin of the fan blade.

The preforms 16, 18 may be made from a multi-axial warp knit fabric/non-crimp fabric as diagrammatically represented in FIG. 3. In the embodiment shown in FIG. 3, the fabric comprises three plies of fibres, which may be carbon fibres oriented in different directions. In an alternative embodiment the fabric may comprise more than three plies of fibres. The plies of fibres are interconnected by stitching which is not shown in FIG. 3 so as to make the fabric handleable. In the fabric shown in FIG. 3, there are two outer plies 20, 22 extending respectively at +45° and −45° to the warp direction (indicated by an arrow X). There is a further ply 24 of fibres which are disposed at 90° to the warp direction X.

As diagrammatically indicated in FIG. 3, the area density of the 90° fibres varies along the warp direction. In FIG. 3, stepwise area density changes are represented by regions A, B, C and D, with the area density being highest in region A and lowest region D. Alternatively the area density may change gradually. It will be appreciated that the regions A to D are repeated along the warp direction X. In practice, the fabric is supplied in rolls, the length shown in FIG. 3 being only a small part of a complete roll-supplied web.

Two cut-outs 26, 28 are represented in FIG. 3, extending over a single length of the fabric embracing a single set of regions A to D. The cut-outs 26, 28 represent pieces to be used in the lay-up of the preforms 16, 18, and their lengthwise direction (in the warp direction X) is coincident with the spanwise direction of the finished fan blade. The 90° fibres 24 thus extend chordwise of the finished blade. The shapes are cut, for example by laser cutting or ultrasonic cutting, under CNC control and deposited successively onto preform tooling in one axis of laminating, so minimising manual handling. In this construction method, the ply drop-offs (cut fibre terminations) would be of one fabric thickness. In the finished product, failure of the article by cracking is most likely to occur in the layer of 90° fibres. In the fabric shown in FIG. 3, the 90° fibres are disposed between the +45° and −45° fibres 20, 22, and so fibre terminations along the span are mainly at ±45°, with the 90° fibre terminations being disposed within the textile reinforcement. Also, because the area density of 90° fibres decreases in the direction from the region A to the region D, relatively few 90° ply drop-offs are present at least in the regions C and D.

Because the skin formed from the preforms 16, 18 contains only +45° and −45° fibre orientations, the tensile and compressive strain allowable in the spanwise direction of the finished blade can be expected to be relatively high, for example approximately 0.6%.

To avoid stress differentials in the lay-up of the preforms 16, it is desirable for differently "handed" fabrics to be supplied for cutting-out of the pieces 26, 28. Thus, on one side of the central plane of each preform 16, 18, a left-handed fabric is laid-up, and on the other side of the central plane a right-handed fabric is laid-up. The terms left-handed and right-handed are used for convenience to distinguish the two different fabrics. It will be appreciated that if a fabric is constructed in which the lower ply is at +45° to the warp direction X, and the upper ply is at −45° to the warp direction X, this relationship will remain even if the fabric is turned over. In other words, it is not possible to lay-up the fabric so that the lower ply is at −45° to the warp direction. Consequently, the use of matched left and right handed pairs of fabrics as described above provides a balanced symmetric lay-up within the preform 16,18.

Once the preforms have been made, they are placed on opposite sides of the core 2, as shown in FIG. 4, and the resulting assembly is placed in a resin transfer moulding (RTM) mould. Resin is then injected into the mould to impregnate the preforms 16, 18 and the reinforcement fabric or overwrapping 12 of the individual core components 4, 6.

The mould has an internal cavity having a shape corresponding to the desired shape of the final fan blade. Resin is injected into the mould cavity to impregnate the preforms 16, 18 and the reinforcement fabric or overwrapping 12 of the core components 4, 6 of the core 2. The resin is caused or allowed to cure, after which the finished moulding is removed from the mould and any secondary machining operations, for example to remove flash, to form the root region of the blade or to prepare the blade for attachment of other components, such as leading or trailing edge impact and erosion surfaces, as indicated at 30 and 32 in FIG. 5.

If desired, stitching or tufting may be applied after RTM moulding, in order to secure the outer skin to the core 2 to enhance damage tolerance. In this process, a single needle and reinforcement thread of carbon fibre, glass fibre or aramid/para-aramid are pushed through the skin into the core 2. The friction between the thread and the skin holds the thread in place as the needle is withdrawn, forming a loop or tuft bridging the skin and core 2.

Figure 5:
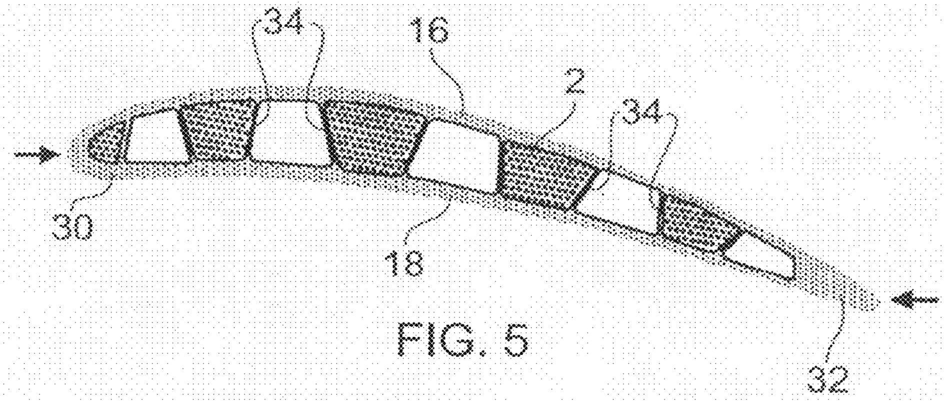
FIG. 5 shows a completed fan blade.

In the finished fan blade represented in FIG. 5, the rods 8 which support centrifugal forces applied to the blade are disposed internally of the blade and so are protected from impact damage by the skin formed by the preforms 16, 18. Also, because the rod packs 4 are made up of the closely packed rods 8, rather than a laminar arrangement of reinforcing fabrics, damage extending into the core 2 cannot easily propagate through the core 2 because there are no straight "runs" between adjacent rods 8. This is in contrast to a traditionally laid-up blade using fabric reinforcements where cracks can propagate between adjacent layers of the fabric.

Furthermore, the resin matrix 10 within the which the rods 8 are embedded is effective in transferring loads between adjacent rods, while accepting relatively high strain without failure.

The resin forming the resin matrix 10 can be selected or formulated to provide desired damping characteristics in the structure. The material may be a syntactic gap filling polyurethane or epoxy paste, or a syntactic film may be used in the manufacture of honeycombed sandwich panel composites for the purpose of stabilising or joining core materials. The material may also be of thermoplastic composition.

As an alternative to using such a material, the rod packs 4 may be formed by compression moulding the rods 8 within a bulk moulding compound containing chopped fibre, so creating a quasi-homogenous composite matrix surrounding the rods 8. The chopped fibre may be glass, carbon or a hybrid of the two. The matrix resin is preferably compatible with the rods 8 themselves. A suitable material is available under the name HexMC®, available from Hexcel Corporation of Stamford, Conn., USA.

In the blade shown in FIG. 5 the core components 4, 6 are generally trapezoidal in cross-sectional shape and run generally parallel to the span-wise direction of the blade, so they are oriented in line with the primary axial centrifugal force load. At the junctions of adjacent core components 4, 6 the abutting regions of the reinforcement fabric or overwrapping 12, impregnated with the cured resin introduced during the RTM process forms webs 34 which provide a shear connection between the pressure and suction surfaces of the fan blade. The reinforcement fabric or overwrapping 12 of the core components 4, 6 may be made up of a substantially ±45° fabric wrap, braided sock or overbraid formed directly on the pack. In other embodiments, it may be desirable for the overwinding to have fibres in three orientations, for example ±45° 0° so as to blend the stiffness between the rods (at 0°) and the ±45°, 90° skins formed from the preforms 16, 18. In the process described above, the overwindings are applied in dry form to be impregnated during the RTM process, but alternatively they may be formed from pre-impregnated material.

The skins formed from the preforms 16, 18, with the ±45°, 90° fibre reinforcements, provide flutter resistance and torsional stiffness to the component. While the process described above refers to the preforms 16, 18 being applied in dry form (apart from the heat or pressure sensitive bonding material between the fabric layers), it is possible for these skins to be formed by other processes for example pre-preg lay-up or overbraiding.

When the skin is formed from preforms 16, 18 as described in FIG. 4, the preforms are preferably compressed, before application to the core 2, to substantially their final thickness, or at least to a thickness not more than 10% above the final moulded thickness in the finished fan blade.

Figure 6:
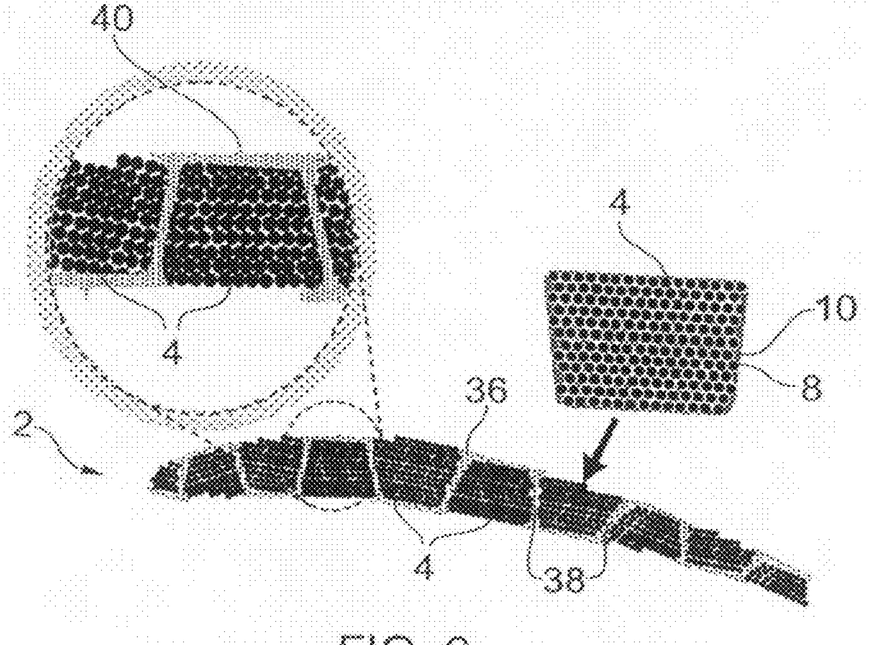
FIG. 6 shows an alternative core structure.

In an alternative embodiment, as shown in FIG. 6, all of the components of the core comprise rod packs 4. The rod packs 4 are not overwound as described with reference to FIG. 1, but are instead compression moulded together to form the core 2 along with a chopped pre-preg sheet moulding compound, or similar material. Thus, the rod packs 4 are assembled together with such a sheet moulding compound 36 which is deflected alternately around adjacent packs 4. The sheet moulding compound 36 thus forms shear webs extending across the core, to provide a shear connection between the pressure and suction sides of the finished blade.

As in the embodiment shown in FIGS. 4 and 5, the core 2 shown in FIG. 6 may be provided with a skin, either formed from preforms 16, 18 as shown in FIG. 4, or in any alternative manner. For example, the preforms 16, 18 could be made from a chopped pre-preg moulding compound. After assembly of the preforms 16, 18 with the core 2 the assembly would be subjected to a final compression moulding step which would integrate the skin with the webs 38 formed by the bulk moulding compound between adjacent rod packs 4.

As shown in FIG. 6, outwardly facing surfaces of the sheet moulding compound which, with the rod packs 4, form the core 2 may be provided with small projections 40 of defined height. These projections serve, during the compression moulding step, to centre the core within the mould so as to establish a required thickness of the moulding compound applied over the core 2 to form the skin of the fan blade. This measure would thus prevent the thickness of each skin from falling below a minimum value during the compression moulding step.

While the unnotched in-plane properties of chopped prepreg compression moulding compounds may be inferior to those of conventional continuous fibre quasi-isotropic laminates as described above with reference to FIGS. 3 and 4, the notched tensile and compression properties are similar.

Of course, the core 2 shown in FIG. 6 could have an outer skin applied to it by use of compressed preforms of multiaxial warp knit fabric as described above with reference to FIGS. 3 and 4, in which case the protrusions 40 would also provide thickness control between the skin of the fan blade and the web structure constituted by the moulding compound 36.

Although the fabric shown in FIG. 3 is referred to as being formed from carbon fibres it will be appreciated that other suitable fibre reinforcement materials may be used. For example, S-glass fibre available from Owens-Corning of Toledo, Ohio, USA, or other high-strength fibres may be used. A more conventional broadly isotropic lay-up construction may be used to achieve an adequate level of damage tolerance.

Although the present invention has been described in connection with the manufacture of a fan blade for a turbofan engine, it will be appreciated that other articles could be manufactured in the same manner. For example, blades for open-rotor and propeller structures (for example turbo prop, ducted fans and other such turbomachinery) could be manufactured by the processes described with reference to FIGS. 1 to 6. For such articles, and similar articles with relatively slender and deep sections, may have an outer skin formed using a biaxial/triaxial braided reinforcement over a core comprising or including reinforcement rods 8 in a resin matrix.

The manufacturing process may also be suitable for static aerofoil structures and non-aerofoil components, such as blade containment structures for gas turbine engines or, indeed, any components where it is desirable to separate and protect the integrity of elements which provide axial or radial strength of the component from specific damage threats.

The invention claimed is:

1. An article formed from a composite material, the article comprising adjacent core components with a web disposed between the core components, wherein at least one of the core components comprises a pack of reinforcement rods disposed parallel to each other and embedded in a resin matrix, each rod comprising a resin-bonded bundle of reinforcement fibres.

2. An article as claimed in claim 1, in which the rods each have a circular cross-section.

3. An article as claimed in claim 1, in which the cross-section of each rod has a transverse dimension which is not less than 1.5 mm and not more than 3.5 mm.

4. An article as claimed in claim 1 in which the reinforcement fibres comprise carbon fibres.

5. An article as claimed in claim 1, in which the resin matrix comprises a cured syntactic material.

6. An article as claimed in claim 1, in which the resin matrix comprises an adhesive composition.

7. An article as claimed in claim 1, in which the resin matrix comprises a composite moulding compound.

8. An article as claimed in claim 1, in which the pack is one of a plurality of packs forming the article.

9. An article as claimed in claim 1, in which the or each pack comprises not less than 100 of the reinforcement rods.

10. An article as claimed in claim 1, in which the or each pack is overwrapped by braiding or reinforcement fabric.

11. An article as claimed in claim 1, in which each reinforcement rod is provided with an overwinding of reinforcing fibres in a resin matrix.

12. An article as claimed in claim 1, in which each reinforcing rod comprises a main body having a spacing projection for spacing the main bodies of adjacent rods from one another.

13. An article as claimed in claim 12, in which the spacing projection is of spiral form about a longitudinal axis of the respective rod.

14. An article as claimed in claim 1, in which the reinforcing rods extend substantially parallel to a lengthwise direction of the article.

15. An article as claimed in claim 1, in which the pack constitutes a core of the article which is provided with an outer layer enclosing the core.

16. An article as claimed in claim 15, in which the outer layer comprises reinforcement fibres in a resin matrix.

17. An article as claimed in claim 16, in which the reinforcement fibres are disposed in fabric layers.

18. An article as claimed in claim 17, in which each of the fabric layers comprises a multi-axial warp knit fabric.

19. An article as claimed in claim 18, in which the multi-axial warp knit fabric comprises fibres oriented at +45°/90°/−45° with respect to lengths of the rods.

20. An article as claimed in claim 19, in which the area weight of the fibres oriented at 90° varies in a lengthwise direction of the rods.

21. An article as claimed in claim 15, in which the outer layer comprises separate preforms applied to the core.

22. An article as claimed in claim 1, which is a component of a gas turbine engine.

23. An article as claimed in claim 22, in which the article is an aerofoil component.

24. An article as claimed in claim 23, which is a fan blade of a turbofan engine.

25. A method of manufacturing an article of composite material, the method comprising:

assembling a plurality of reinforcement rods into a pack in which the rods are parallel to each other, each rod comprising a resin-bonded bundle of reinforcement fibres;

impregnating the pack with at least one of a settable or curable first composition, at least one of causing or allowing the first composition to set or cure to form a resin matrix in which the rods of the pack are embedded;

providing a fibre wrapping around the pack to form a core component;

assembling a core of the article, the core including adjacent core components with a web disposed between the core components;

assembling a fibre reinforcement over the core;

placing the core with the assembled fibre reinforcement in a mould corresponding to the desired shape of the article;

admitting at least one of a settable or curable second composition into the mould; and at least one of causing or allowing the second composition to set or cure to form the article.

26. A method as claimed in claim 25, in the assembling the fibre reinforcement comprises assembling preforms, each made up of reinforcing fabric layers over the core.

* * * * *